July 23, 1968
W. W. BROWN
3,393,701
PRESSURE RESPONSIVE DEVICE
Filed Feb. 2, 1966
2 Sheets-Sheet 1
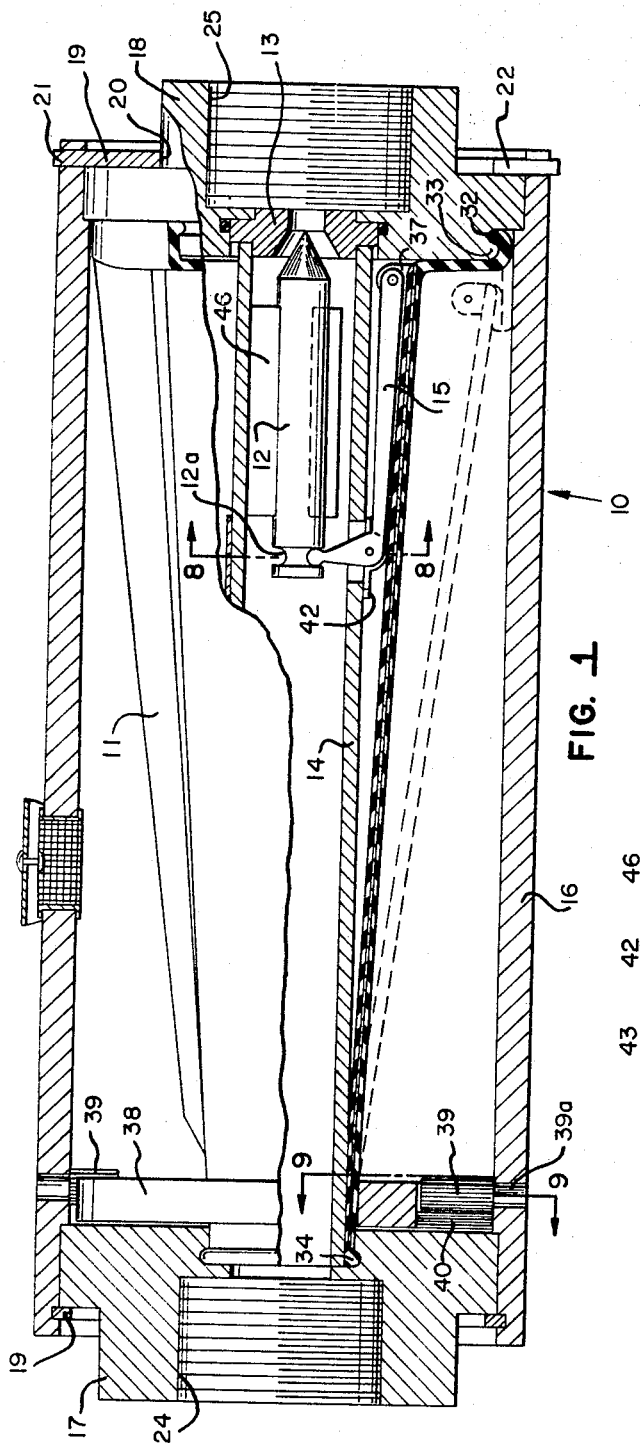
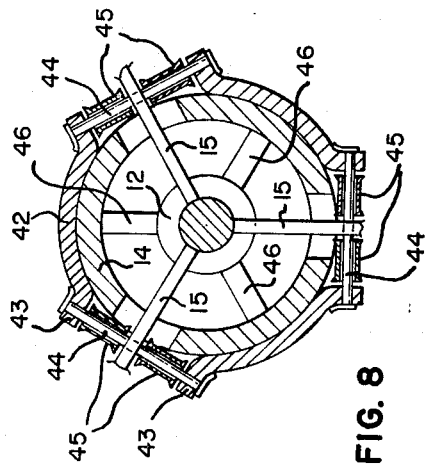
INVENTOR.
WALLACE W. BROWN
BY Hoppe Mitchell Murtha
and Anderson
ATTORNEYS INVENTOR.
WALLACE W. BROWN
BY Hopper, Mitchell, Martha
and Anderson
ATTORNEYS 3,393,701
PRESSURE RESPONSIVE DEVICE
Wallace W. Brown, 113 Altena St.,
San Rafael, Calif. 94901
Filed Feb. 2, 1966, Ser. No. 533,108
16 Claims. (Cl. 137—505.29)

This invention relates to pressure responsive devices and more particularly involves novel improvements in a device for regulating the delivery of gas and maintaining a constant downstream pressure. Devices of this kind are employed in great numbers by gas utility companies and are commonly connected between a main gas line and the outlet to each consumer.

In brief, the present invention contemplates the use of an expandable tubular diaphragm for operating a valve element and regulating the flow through the diaphragm. The use of the expandable tubular diaphragm admits of a regulator construction which can be installed in any position without affecting its operation. Importantly, the regulator itself can serve as a column or coupling between a service line and a house line, and it will be self-supporting.

It is one object of the present invention to provide a pressure responsive device of the type described and further having a diaphragm formed with a plurality of multiple side walls circumferentially spaced equal distances apart and each of which is free to move in a generally radial direction relative to the flow through the diaphragm.

Another object of the invention is to provide a pressure responsive device of the type described wherein each side wall is biased in the direction toward the flow axis by a resilient means that may be externally adjusted.

A further object of the invention is to provide a pressure responsive device of the kind described which may be inexpensively constructed and which is easy to maintain and repair.

Other objects of this invention will become apparent in view of the following detailed description and the accompanying drawings.

In the drawings forming a part of this application and in which like parts are identified by like reference numerals throughout the same, FIG. 1 is a substantially longitudinal center section of a pressure responsive device constructed in accordance with the teaching of this invention;

FIG. 8 is an enlarged transverse section taken on lines 8—8 of FIG. 1 to show details of the valve actuating mechanism; and FIG. 9 is an enlarged detailed section taken on lines 9—9 of FIG. 1.

Figures 3, 4:
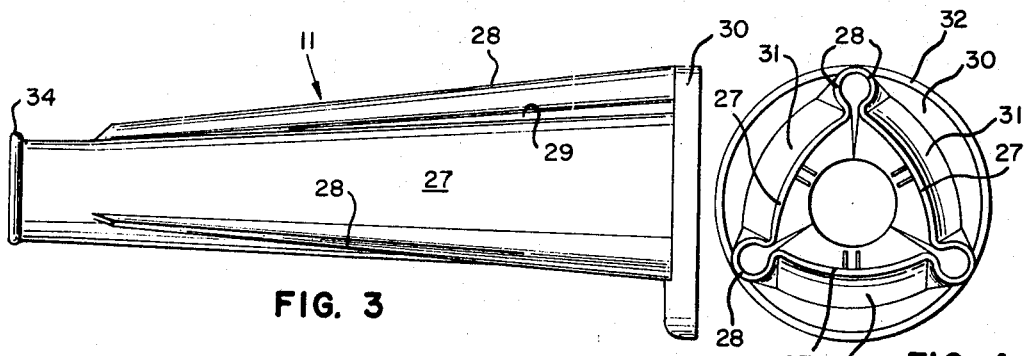
FIG. 3 is a side elevation of the diaphragm.

Referring to FIG. 1 in particular, there is shown a pressure responsive device constructed in accordance with the teaching of this invention and generally indicated by the reference number 10. This device essentially comprises an expandable tubular diaphragm 11, a valve element 12, a valve seat 13, a flow tube 14, and a plurality of valve operating levers 15. A housing is also provided for connecting the essential operating mechanism into a flow line. This housing comprises a body 16 formed with a cylindrical cavity and a pair of end plugs 17 and 18. Each end plug abuts against a shoulder formed within body 16 and is held in place by a resilient retainer ring 19.

Retainer rings 19 are received in peripheral grooves formed at each end of the body and each ring is constructed to prevent rotation relative to body 16 and to end plugs 17 and 18. For this purpose, one side of each ring 19 extends inwardly and is formed with a straight edge 20 that engages a flat surface on the associated end plug, thus preventing relative rotation between a ring and its end plug. Rotation of the rings relative to body 16 is prevented by a detent 21 and legs 22 which are formed integrally with the rings. Detent 21 is received through a slot in body 16 on one side while legs 22 are received in a slot in the opposite side of body 16. Retainer rings of this kind are well known in the art and are believed to be an effective means for rapidly assembling the pressure responsive device described.

It will be seen that end plugs 17 and 18 are each formed with concentric openings 24 and 25, respectively, each opening aligned with the axis of flow tube 14 and diaphragm 11. In addition, openings 24 and 25 are internally threaded as to provide pipe connections for rapidly assembling the device in a rectilinear pipeline.

The details in construction of tubular diaphragm 11 are better shown in FIGS. 2–7. With reference thereto, diaphragm 11 comprises a plurality of movable side walls 27 which are circumferentially spaced equal distances apart and connected between circumferentially spaced ribs 28 by flexible membranes 29. Side walls 27 are also flexibly connected at the inlet end to a circular collar 30 by flexible membranes 31. Collar 30 is formed with a resilient edge that allows it to be stretched around a flange 33 formed on end plug 18. Edge 32 is received in a recess in back of flange 33, as shown in FIG. 1.

Although side walls 27 are flexibly connected to ribs 28 by membrane 29, they come together and form a collar of reduced diameter, said collar being formed with a circular resilient bead 34. This bead, which is received in a peripheral recess of end plug 17, fluidly seals the outlet end of the diaphragm.

Figures 5, 7:
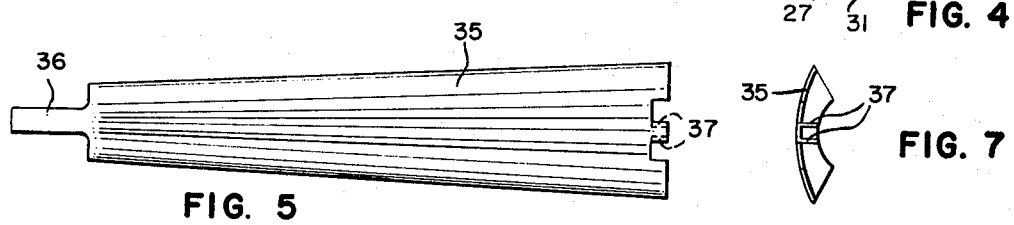
FIGS. 5–7 are plan, side and end views of a leaf spring which forms a part of the diaphragm.
Figure 6:
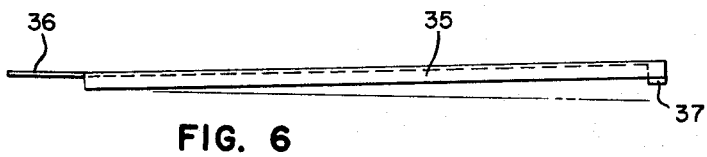
Figure 2:
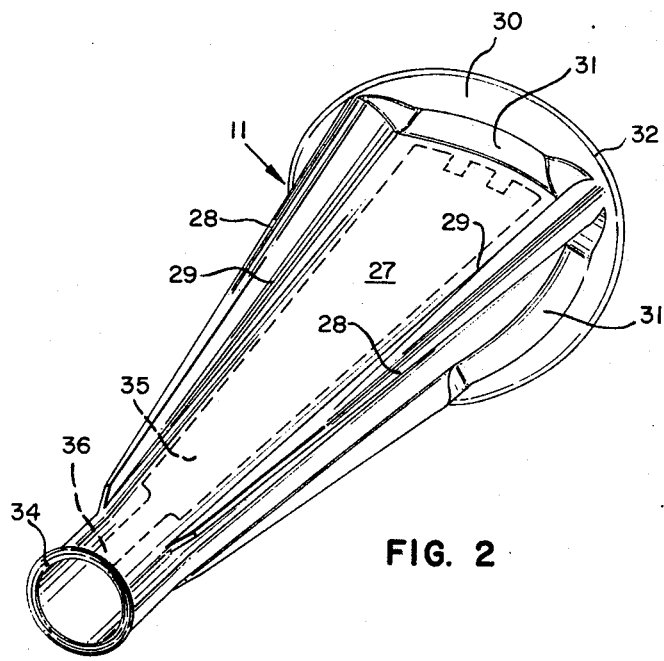
FIG. 2 is a perspective view of the expandable tubular diaphragm used in the pressure responsive device.

FIGS. 5–7 illustrate the construction of metallic plates 35, one of which is imbedded in each side wall 27. Each plate 35 is formed with a finger-member 36 that acts as a leaf spring and biases the side wall inwardly toward the flow axis. The opposite end of each plate 35 is formed with a pair of ears 37 that may be cut out of the plate itself and bent downwardly to provide a pivot support for valve operating levers 15.

Referring again to FIG. 1, the outlet end of diaphragm 11 is received through a floating collar 38 which may be axially positioned to adjust the bias of springs 36. It will be noted that when diaphragm 11 is properly assembled to end plug 17, springs 36 extend into floating collar 38. The axial position of collar 38 along springs 36 will, of course, determine the effective length of each spring, which in turn establishes the bias which those springs impose upon their respective side walls 27. The position of ring 38 may be adjusted externally of the housing by rotating a pair of gears 39 mounted on housing 16, said gears being disposed on diametrically opposite sides of housing 16 and engaged with rack surfaces 40 formed on ring 38. Details of this construction are shown in FIG. 9, in view of which it will be seen that gears 39 are mounted on stems 39a which may be slotted for engagement by a screwdriver or special adjustment tool. In effect, rotating gears 39 moves floating collar 38 axially of the diaphragm, thereby changing the fulcrum point of each leaf spring and the calibrated bias imposed on each side wall.

With particular reference to FIG. 8, each valve operating lever 15 is pivotally connected to a pair of ears 37 on a side wall plate 35. In addition, each lever is mounted on a sliding collar 42 having sections cut away and bent outward to form ears 43 that support the valve operating levers on a pin 44. Spacer bushings 45 are used for positioning the end of levers 15 in a circular recess 12a of valve element 12.

Flow tube 14 essentially serves as a mounting for the valve element 12 and a support for sliding collar 42. Vane members 46 are provided within the flow tube to position valve element 12 in axial alignment relative to valve seat 13, which is seated in a recess concentric with opening 25 of inlet plug 18.

In operation of the device illustrated, gaseous fluid is introduced through end plug 25, passing through valve seat 13, flow tube 14 and diaphragm 11. The pressure of the gaseous fluid is applied against the inside surfaces of tubular diaphragm 11, thereby causing the side walls 27 to pivot about the fulcrum point of contact which they make with floating collar 38. However, the movement of side walls 27 is resisted by the bias of springs 36, which tend to collapse the side walls in the direction of the flow axis. As the pressure within diaphragm 11 overcomes the bias of springs 36, walls 27 pivot outwardly actuating valve operating levers 15 and moving valve element 12 in the direction of valve seat 13. This operation monitors the amount of gaseous fluid which can enter the pressure responsive device, thereby maintaining a near constant delivery pressure as based on the bias valve and in accordance with demand. In this manner the device equates the inlet and outlet flow rates while holding the desired pressure setting.

It will be further apparent that pressure responsive device 10 will structurally act as a column or coupling between a service line and a house line, and the regulator may be installed in any position without affecting its operation. Moreover, the regulator construction described herein is believed to meet all governing utility codes and other requirements.

Although a specific embodiment of the invention is illustrated and described, various changes and modifications may be resorted to without departing from the spirit of the invention or the scope of the attached claims, and each of such changes or modifications is contemplated.

Having thus described my invention, what I claim and desire to secure by Letters Patent is:

1. A pressure responsive device comprising: an expandable tubular diaphragm formed with a plurality of movable side walls circumferentially spaced equal distances apart, one end of each side wall being pivotally secured, the other end being free to pivot transversely in a generally radial direction relative to flow through said diaphragm; means for connecting the ends of said tubular diaphragm into a flow line; valve means including a movable valve element for regulating the flow through said diaphragm; and actuating means for positioning said valve element in response to the expansion and contraction of said tubular diaphragm.

2. The pressure responsive device of claim 1 and further wherein each side wall comprises a leaf spring extending in a generally longitudinal direction.

3. The pressure responsive device of claim 2 wherein each leaf spring is fulcrumed on a collar that encircles said diaphragm.

4. The pressure responsive device of claim 3 wherein said collar is axially movable along said tubular diaphragm for changing the fulcrum point longitudinally of each leaf spring.

5. The pressure responsive device of claim 1 and further wherein the other end of each side wall is pivotally connected to a lever engaged with said valve element.

6. The pressure responsive device of claim 5 and further comprising a rigid flow tube extending through said tubular diaphragm, one end of said diaphragm being supported on said tube and fluidly sealed thereto, the inside of said flow tube being in open fluid communication with the inside of said tubular diaphragm.

7. The pressure responsive device of claim 6 and further comprising means for mounting said valve element within said flow tube for relative movement in an axial direction.

8. The pressure responsive device of claim 1 and further comprising a housing having a body formed with a cylindrical cavity and concentric openings aligned with the axis of said tubular diaphragm.

9. The pressure responsive device of claim 8 and further comprising a rigid flow tube extending through said tubular diaphragm, the ends of said flow tube being received within said concentric openings, one end of said diaphragm being supported on said tube and fluidly sealed thereto.

10. A pressure responsive device comprising: an expandable tubular diaphragm; means for connecting the ends of said tubular diaphragm into a flow line; valve means including a movable valve element for regulating the flow through said diaphragm; a housing having a body formed with a cylindrical cavity and concentric openings aligned with the axis of said tubular diaphragm; a rigid flow tube extending through said tubular diaphragm, the ends of said flow tube being received within said concentric openings, one end of said diaphragm being supported on said tube and fluidly sealed thereto; and actuating means for positioning said valve element in response to the expansion and contraction of said tubular diaphragm, said actuating means comprising a lever engaged with said valve element, said lever being pivotally mounted to an arcuate member supported on said flow tube.

11. A pressure responsive device comprising: an expandable tubular diaphragm formed with a plurality of movable side walls circumferentially spaced equal distances apart, each side wall comprising a leaf spring extending in a generally longitudinal direction; means for connecting the ends of said tubular diaphragm into a flow line; valve means including a movable valve element for regulating the flow through said diaphragm; a housing having a body formed with a cylindrical cavity and concentric openings aligned with the axis of said tubular diaphragm; a rigid flow tube extending through said tubular diaphragm, the ends of said flow tube being received within said concentric openings, one end of said diaphragm being supported on said tube and fluidly sealed thereto; and actuating means for positioning said valve element in response to the expansion and contraction of said tubular diaphragm.

12. The pressure responsive device of claim 11 wherein each leaf spring is fulcrumed on a collar that encircles said diaphragm, said collar being located within said housing.

13. The pressure responsive device of claim 12 and further comprising means for adjustably positioning said collar within said housing along said tubular diaphragm for changing the fulcrumed point longitudinally along the leaf springs.

14. The pressure responsive device of claim 13 wherein said means for adjustably positioning said collar comprises a rack surface formed on said collar engaged with a gear rotatably mounted on said housing.

15. A pressure responsive device comprising: an expandable tubular diaphragm; means for connecting the ends of said tubular diaphragm into a flow line; valve means including a movable valve element for regulating the flow through said diaphragm; a rigid flow tube extending through said tubular diaphragm, one end of said diaphragm being supported on said tube and fluidly sealed thereto, the inside of said flow tube being in open fluid communication with the inside of said tubular diaphragm; and actuating means for positioning said valve element in response to the expansion and contraction of said tubular diaphragm, said actuating means comprising a lever engaged with said valve element, said lever being pivotally mounted to an arcuate member supported on said flow tube.

16. The pressure responsive device of claim 15 and further comprising a housing having axially aligned openings, said flow tube being in fluid communication with the openings of said housing, the ends of said diaphragm being fluidly sealed to said housing.

References Cited

UNITED STATES PATENTS

| | | | |
|---|---|---|---|
| 2,693,820 | 11/1954 | Jones | 251—282 XR |
| 3,136,329 | 6/1964 | Issbrucker | 137—505.18 XR |
| 3,253,608 | 5/1966 | Davis | 137—505.25 XR |

FOREIGN PATENTS

| | | |
|---|---|---|
| 357,322 | 11/1905 | France. |
| 67,882 | 4/1893 | Germany. |
| 536,659 | 5/1941 | Great Britain. |

WILLIAM F. O'DEA, *Primary Examiner.*

H. W. WEAKLEY, *Assistant Examiner.*